US008045684B2

United States Patent
Link, II et al.

(10) Patent No.: US 8,045,684 B2
(45) Date of Patent: Oct. 25, 2011

(54) SECURELY SENDING NOTIFICATION OF A NEW INCOMING E-MAIL MESSAGE BY WAY OF A PUBLIC NETWORK

(75) Inventors: Charles M. Link, II, Roswell, GA (US); Vernon Meadows, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 502 days.

(21) Appl. No.: 11/844,373

(22) Filed: Aug. 24, 2007

(65) Prior Publication Data
US 2007/0287426 A1    Dec. 13, 2007

Related U.S. Application Data

(63) Continuation of application No. 09/736,631, filed on Dec. 14, 2000, now Pat. No. 7,266,184.

(51) Int. Cl.
*H04M 11/00* (2006.01)
(52) U.S. Cl. .................................................. 379/93.24
(58) Field of Classification Search ............... 379/93.24, 379/90.01, 93.01, 93.08, 93.23, 142.01, 142.07, 379/142.15, 88.12, 88.13
See application file for complete search history.

(56) References Cited

U.S. PATENT DOCUMENTS

| | | | |
|---|---|---|---|
| 6,212,265 B1 * | 4/2001 | Duphorne | 379/93.24 |
| 6,490,444 B1 * | 12/2002 | Bossemeyer et al. | 379/102.06 |
| 6,724,867 B1 * | 4/2004 | Henderson | 379/88.22 |
| 6,928,070 B2 * | 8/2005 | Emerson, III | 370/352 |

* cited by examiner

*Primary Examiner* — Stella Woo

(57) ABSTRACT

A system notifies a computing device of an incoming message. In the system, a message server is coupled to a data communications network for receiving the incoming message, and a communications system is coupled to the message server so that the message server can communicate to the communications system that the incoming message awaits retrieval by the computing device. A communications line is coupled to the communications system and to the computing device so that the communications system can signal the computing device over the communications line that the incoming message awaits retrieval by such computing device. The computing device is for receiving the aforementioned notification and retrieving the incoming message from the message server, and includes a communications device for coupling with the aforementioned communications line. The communications device implements an on-hook signaling protocol for receiving data sent when the communications line is on-hook, where the received data includes the notification of the new incoming message.

7 Claims, 3 Drawing Sheets

SECURELY SENDING NOTIFICATION OF A NEW INCOMING E-MAIL MESSAGE BY WAY OF A PUBLIC NETWORK

RELATED CASES

This application is a continuation of U.S. patent application Ser. No. 09/736,631 entitled SECURELY SENDING NOTIFICATION OF A NEW INCOMING E-MAIL MESSAGE BY WAY OF A PUBLIC NETWORK, filed on Dec. 14, 2000 now U.S. Pat. No. 7,266,184 and is hereby incorporated by reference in its entirety.

FIELD OF THE INVENTION

The present invention relates to a system and method for providing notification from an e-mail provider of a new incoming e-mail message. More particularly, the present invention relates to providing the notification in a secure manner by way of a public communications network.

BACKGROUND OF THE INVENTION

E-mail (i.e., electronic mail) is nearly ubiquitous in the business world, and is becoming ubiquitous in the personal world, too. As known, such e-mail comprises e-mail messages, where each message typically can include text, pictures, video, audio, and the like. In addition, each message can include pictures, video, audio, and practically any type of digital computer file as attachments. Once composed by a first entity, each message can be transmitted from the first entity to one or more second entities. Typically, an e-mail message is formatted and transmitted by way of the Internet according to a generally standardized protocol, although other transmission devices and other protocols are known.

While the advantages of e-mail are many and well known, such e-mail also has some disadvantages. Chief among such disadvantages is the fact that e-mail typically requires the use of a personal computer or the like for composing, sending, receiving, and viewing e-mail messages, and the like. Such personal computer can be relatively expensive, and can require a relatively high degree of expertise to operate and maintain. Of course, the same can be said for e-mail software applications that run on such personal computer. Such expense and expertise can be especially daunting for some individuals, with the result being that such individuals do not have access to e-mail. As is known, even individuals who regularly use personal computers and e-mail software applications can experience baffling problems that require time and knowledge to fix. For individuals who do not regularly use personal computers and e-mail software applications, such problems when they occur can be insurmountable.

To avoid the aforementioned problems, it is known for an e-mail subscriber to employ an e-mail appliance rather than a personal computer or the like. Such e-mail appliance is a dedicated hardware device coupled to a network for composing, sending, receiving, and viewing e-mail messages. Typically, the e-mail appliance includes appropriate computer components including a modem or the like, and contacts an e-mail server or the like by way of a public communications network such as the public switched telephone network (PSTN) or the like by way of a telephone line or the like. Once contacted, the e-mail server and the e-mail appliance cooperate to send an e-mail message from the e-mail appliance and receive e-mail at the e-mail appliance, all by way of an appropriate e-mail address for the e-mail subscriber employing the e-mail appliance.

Nevertheless, there is still a certain segment of the general population that may have difficulty commanding an e-mail appliance to operate, especially when such operation involves checking for and receiving new incoming e-mail messages. Moreover, even if the e-mail appliance is operable by an e-mail subscriber in such regard, such subscriber must regularly command the e-mail appliance to check with the e-mail server to see if new incoming e-mail messages exist and if so to receive such new incoming e-mail messages.

Some e-mail appliances therefore include a regular incoming e-mail automatic checking call-in routine. Essentially, in such automatic routine, the e-mail appliance as coupled to the PSTN by the modem and the telephone line causes the line to go off hook, places a call to a telephone number by which the e-mail server is accessed, performs a handshaking protocol to identify itself to the e-mail server, collects any waiting e-mail messages from the e-mail server, and then ends the call by causing the line to go on hook. If new e-mail messages are waiting to be reviewed, the e-mail appliance may activate a message waiting annunciator such as a light or a sound to thereby alert the e-mail subscriber of such new e-mail messages.

While such routine is sufficient in the abstract, it is to be understood upon further examination that such routine suffers several deficiencies. Firstly, it is to be noted that the regular call-in routine might be performed several times a day, i.e., semi-hourly, hourly, bi-hourly, etc., and that the telephone line will be employed many times every day. Thus, if the line is billed per call, and/or if the call is not to a local number, the resulting line charges incurred by the e-mail subscriber can quickly become significant. Moreover, if each call is paid for by an e-mail service provider (i.e., the proprietor of the e-mail server) the resulting line charges incurred by such provider can quickly become staggering, especially if a significant number of subscribers automatically call in many times every day.

Secondly, it is to be noted that if a significant number of subscribers automatically call in many times every day, the shear volume of such calls may tax the resources of the e-mail server excessively. As should be appreciated, the e-mail server likely includes or is coupled to one or modems, and such modem(s) can handle only so many calls. Moreover, if e-mail subscribers regularly experience delays in receiving their incoming e-mail because each such e-mail server modem is busy, such e-mail subscribers will quickly become dissatisfied customers.

Thirdly, it is to be noted that if the telephone line employed by the e-mail appliance is also employed as a voice-calling line by the e-mail subscriber, such line may at times be unavailable to the e-mail appliance for the regular call-in routine, especially if the e-mail appliance performs the call-in routine many times every day. Even worse, if not properly configured, the e-mail appliance may attempt to perform the call-in routine while the e-mail subscriber is on the line.

Accordingly, a need exists for a method and apparatus for allowing the e-mail server to automatically notify the e-mail appliance that new incoming e-mail is awaiting retrieval by such e-mail appliance. More generally, a need exists for a method and apparatus for allowing the e-mail server to automatically notify an e-mail user that new incoming e-mail is awaiting retrieval by such e-mail user. Thus, the e-mail appliance/user need not regularly perform any call-in routine to determine whether new incoming e-mail is awaiting retrieval.

SUMMARY OF THE INVENTION

In the present invention, the aforementioned need is satisfied by a system that notifies a computing device of an incoming message. In the system, a message server is coupled to a data communications network for receiving the incoming message, and a public communications system is coupled to the message server so that the message server can communicate to the communications system that the incoming message awaits retrieval by the computing device. A communications line is coupled to the communications system and to the computing device so that the communications system can signal the computing device over the communications line that the incoming message awaits retrieval by such computing device.

The computing device is for receiving the aforementioned notification and retrieving the incoming message from the message server, and includes a communications device for coupling with the aforementioned communications line. The communications device implements an on-hook signaling protocol for receiving data sent when the communications line is on-hook, where the received data includes the notification of the new incoming message.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
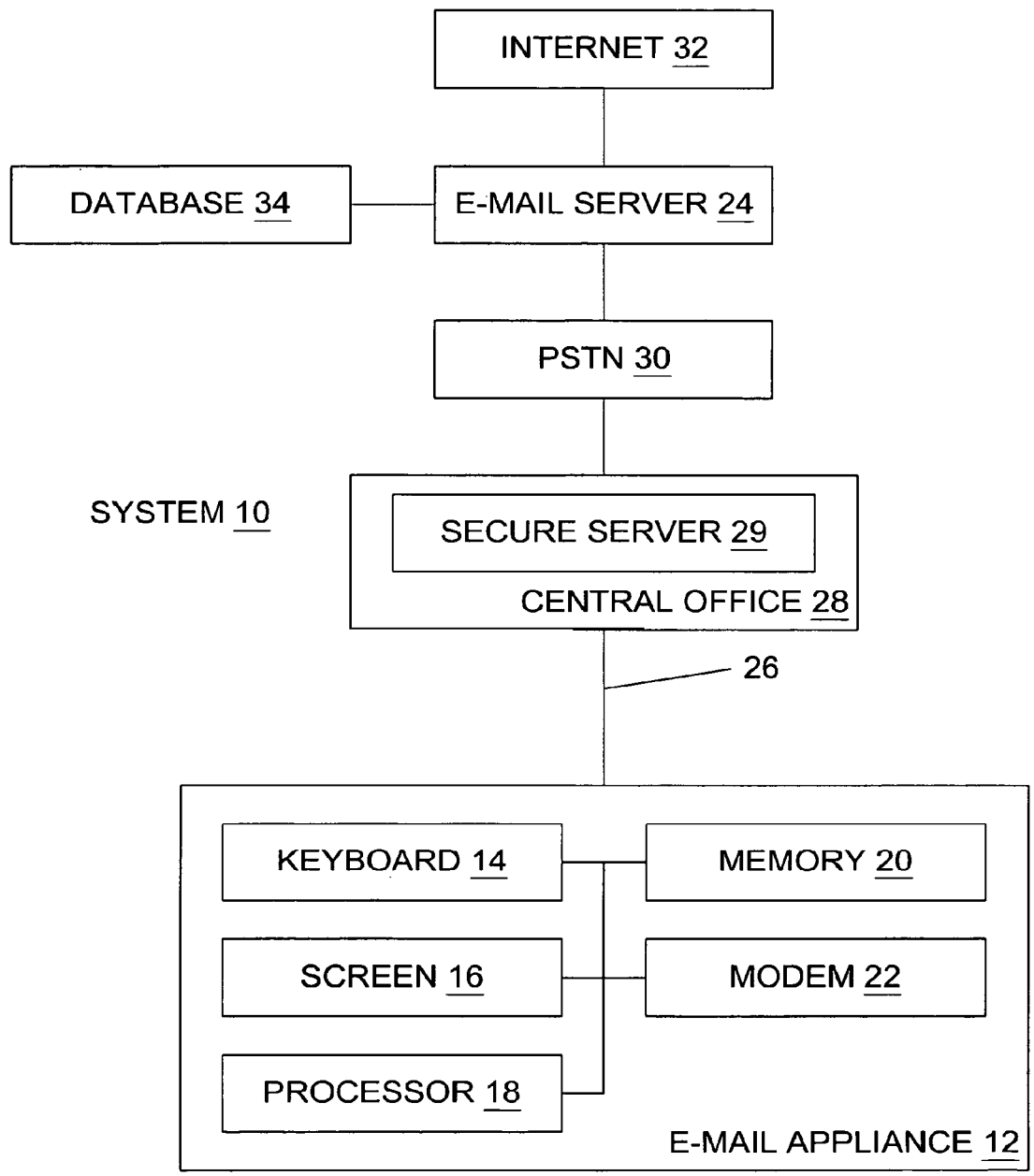
FIG. 1 is a block diagram showing a system having an e-mail appliance coupled to an e-mail server by way of a communications network in accordance with one embodiment of the present invention.

Referring now to FIG. 1, a system 10 for implementing an e-mail appliance 12 that automatically receives notification of a new incoming e-mail message is shown in accordance with one embodiment of the present invention. As seen, the e-mail appliance 12 includes appropriate computer components including a data entry device such as a keyboard 14, a data viewing device such as a screen 16, a processor 18, memory 20, and a modem 22, among other things. It should be appreciated, though, that the e-mail appliance 12 may be any particular e-mail appliance and may include any appropriate hardware and/or software without departing from the spirit and scope of the present invention. Moreover, and importantly, although the present invention is discussed in terms of the e-mail appliance 12, the methods of automatically receiving notification of new incoming e-mail discussed herein may be employed in connection with any type of receiving device, including a personal computer or the like.

The e-mail appliance 12 is appropriately coupled to an e-mail server 24 or the like by way of a communications system. Notably, any appropriate communications system may be employed without departing from the spirit and scope of the present invention. As shown, in the communications system, the e-mail appliance 12 may be coupled to a telephone line 26 or the like that is switched at a central office 28 or the like into a communications network such as the public switched telephone network (PSTN) 30. As is known, the PSTN 30 allows telephone communications to be established with practically any other telephone line as long as the other telephone line is also coupled to the PSTN 30. In addition, the PSTN 30 allows other types of communications with other elements that are also coupled to the PSTN 30.

The PSTN 30 includes a voice network through which information is passed between telephone subscribers (i.e., audio conversations, personal computer modem data, etc.), and may also include a data/control network such as the SS7 network for passing data/control information within the PSTN 30 (i.e., call set-up and monitoring information, special services, etc.). As known, SS7 (i.e., Common Channel Signaling System No. 7 or C7) is a global standard for telecommunications defined by the International Telecommunication Union (ITU) Telecommunication Standardization Sector (ITU-T).

The e-mail server 24, then, is coupled to the PSTN 30 so that e-mail messages may be transmitted between such e-mail server 24 and the e-mail appliance 12, and also so that such e-mail server 24 may automatically notify the e-mail appliance 12 of a new incoming e-mail message. Importantly, the e-mail server 24 need not be an entity owned or controlled by the owner/controller of the central office 28. Accordingly, the e-mail server 24 and the central office can be independently owned and controlled. Preferably, the e-mail server 24 is coupled directly to and is provided with access to the data/control network of the PSTN 30, although the e-mail server 24 could also be coupled to the voice network without departing from the spirit and scope of the present invention. In either case, the e-mail server 24 includes an appropriate communications device (i.e., a modem, a router, a network interface card, etc.) for sending and receiving information over the PSTN 30, and the e-mail appliance 12 is provided with an appropriate telephone number for contacting the e-mail server 24 on the infrastructure 30.

As should be appreciated, the e-mail server 24 is also coupled to a data communications network 32 such as the Internet to forward an e-mail message from the e-mail appliance 12 to an ultimate destination, and to receive an e-mail message for the e-mail appliance 12 from its ultimate source. As before, the e-mail server 24 includes an appropriate communications device (i.e., an Internet router, an Internet interface card, etc.) for sending and receiving information over the Internet 32, and such e-mail server 24 is provided with an appropriate Internet address for being contacted by other elements on the Internet 32.

Generally, the e-mail server 24 receives and holds e-mail messages from the Internet 32 for e-mail addresses under its auspices, and forward such held e-mail messages to their ultimate destinations when requested to do so (e.g., by the e-mail appliance 12). Likewise, the e-mail server 24 receives and holds e-mail messages from the e-mail appliance 12, and forward such held e-mail messages to their ultimate destinations by way of the Internet 32 and destination e-mail servers (not shown) coupled to the Internet 32. E-mail servers 24 and coupling e-mail servers 24 to the PSTN 30 and to the Internet 32 are generally known to the relevant public, and therefore need not be disclosed herein in any greater detail except as indicated below. Likewise, communicating e-mail messages between the e-mail server 24 and the Internet and between the e-mail server 24 and the e-mail appliance 12 are also generally known to the relevant public, and therefore need not be disclosed herein in any greater detail except as indicated below. Moreover, telephone lines 26, central offices 28, the PSTN 30, and the Internet 32 are also generally known to the relevant public, and therefore need not be disclosed herein in any greater detail except as indicated below.

In one embodiment of the present invention, rather than having the e-mail appliance 12 call up the e-mail server 24 on a regular basis to determine whether new incoming e-mail is awaiting retrieval from the e-mail server 24, such e-mail server 24 notifies the e-mail appliance 12 that such new incoming e-mail is awaiting retrieval. In particular, the e-mail server 24 directs the central office 28 serving the telephone line 26 to which the e-mail appliance 12 is coupled to signal the e-mail appliance 12 coupled to the telephone line 26 that the new e-mail message is awaiting retrieval. As shown, a secure server 29 at the central office 28 may be employed to communicate with the e-mail server 24 and to interface between the e-mail server 24 and central office 28. The e-mail server 24/secure server 29/central office 28 may employ any appropriate signaling device without departing from the spirit and scope of the present invention. For example, and as will be disclosed in more detail below, the secure server 29 central office 28 may send an e-mail message waiting signal to the e-mail appliance 12, or may place an e-mail message waiting indicator on the telephone line 26.

To communicate to the secure server 29/central office 28 that a new e-mail message is awaiting retrieval, the e-mail server preferably sends an appropriate SS7 message to the secure server 29 at the central office 28 with indicia identifying the e-mail appliance 12 by way of the telephone line 26 to which such appliance 12 is coupled. Thus, for each e-mail appliance 12 served by the e-mail server 24, such e-mail server 24 requires a corresponding e-mail address and a telephone number of the telephone line 26 to which the e-mail appliance 12 is coupled. Preferably, the e-mail server 24 stores such information in an appropriate database 34 on or accessible to the e-mail server 24.

Notably, since the e-mail server 24 is thus a portal into the SS7 network of the PSTN 30, the e-mail server 24 should be highly secure to prevent nefarious/unscrupulous entities from entering such SS7 network. Moreover, the SS7 message should be encrypted according to a secret shared between the e-mail server 24 and the secure server 29/central office 28 (hereinafter 'central office 28') to prevent others on the SS7 network from inappropriately sending such SS7 message to such central office 28. Any appropriate encryption method and secret may be employed without departing from the spirit and scope of the present invention. For example, the encryption method may be based on a security code corresponding to the telephone line 26 and shared between the e-mail server 24 and the central office 28.

Figure 2:
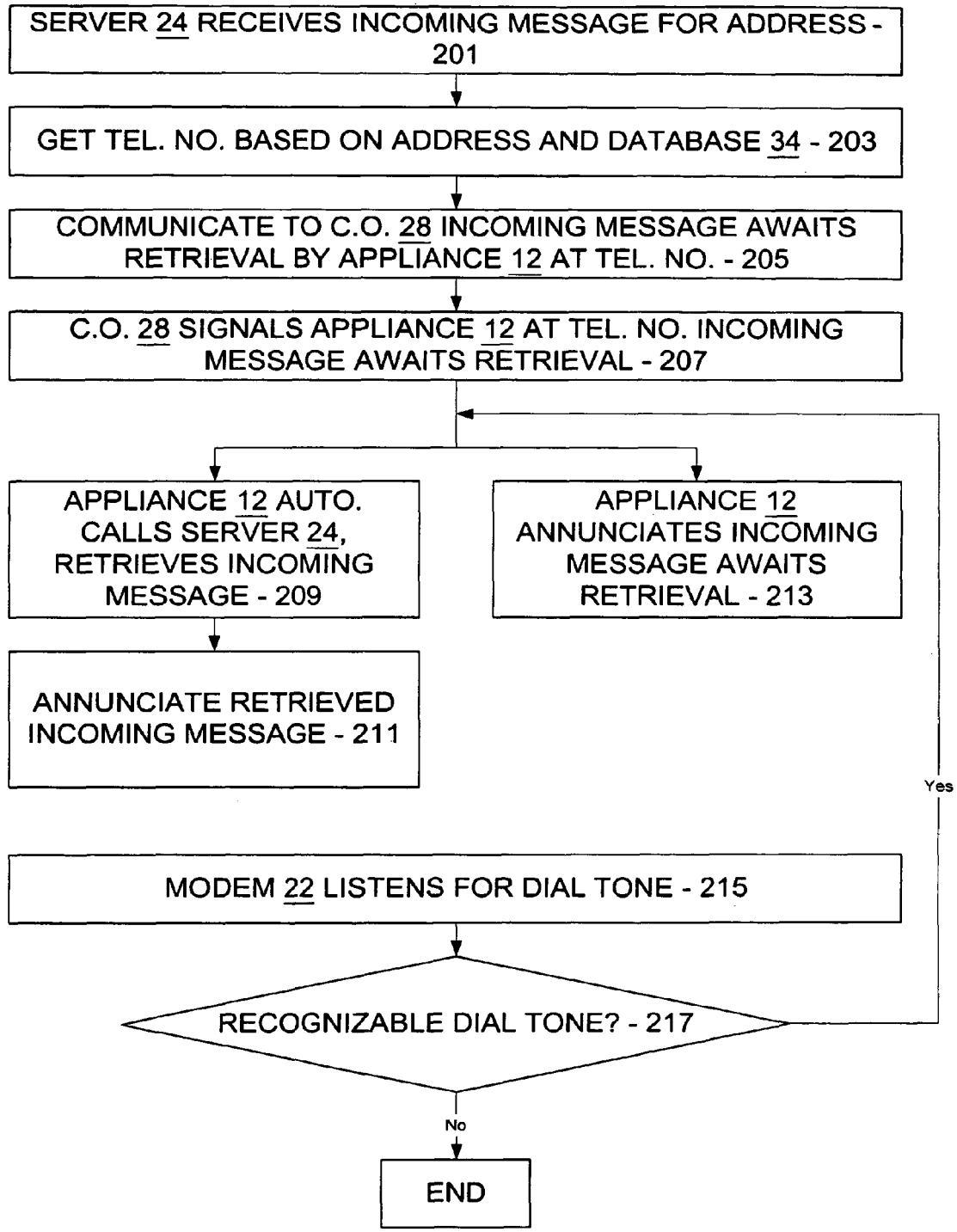
FIG. 2 is a flow chart depicting steps performed by the e-mail appliance, e-mail server, and communications network of FIG. 1 in accordance with one embodiment of the present invention.

In operation, then, and referring to FIG. 2, the e-mail server 24 receives an incoming e-mail message for a particular e-mail address (step 201), determines based on the address and the database 34 that the incoming e-mail message is to be ultimately retrieved by an e-mail appliance 12 coupled to a particular telephone line 26 having a particular telephone number (step 203), and communicates to the secure server 29 at the central office 28 for the telephone number/telephone line 26 that the incoming e-mail message is awaiting retrieval by the e-mail appliance 12 coupled to the telephone line 26 having the telephone number (step 205). Thus, the secure server 29/central office 28 appropriately signals the e-mail appliance 12 by way of such telephone line 26/telephone number that the incoming e-mail message is awaiting retrieval (step 207).

In one embodiment of the present invention, the e-mail appliance 12 can receive such a signal from the central office 28 even if the telephone line 26 is 'on-hook' by way of an appropriate on-hook signal receiving protocol such as the ADSI (Analog Display Services Interface) protocol for sending data over a telephone line. As is known, the ADSI protocol is used in applications such as caller identification devices, where in connection with an incoming telephone call, a calling telephone number and perhaps an associated name are displayed on a caller identification device while the incoming telephone call is ringing and prior to the called party telephone going off-hook. Any other appropriate protocol may be employed without departing from the spirit and scope of the present invention.

Figure 3A:
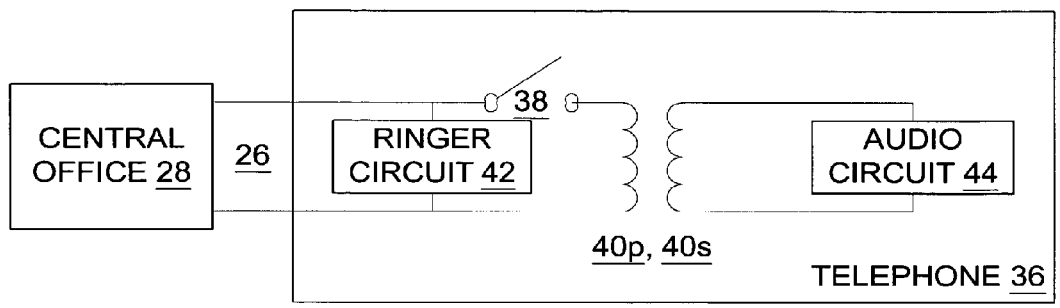
FIG. 3A is a schematic diagram of a telephone line and telephone device in a non-ADSI arrangement.

Although the ADSI protocol is generally known to the relevant public, a short discussion is provided herein for completeness. Referring now to FIG. 3A, it is seen that in a typical non-ADSI telephone arrangement, a device such as a typical telephone 36 is coupled to a central office 28 by way of a telephone line 26. The typical telephone line 26 is a pair of conductors, and a hook switch 38 and the primary of a transformer 40*p* are coupled in series across the pair of conductors. In addition, a ringer circuit 42 is coupled across the pair of conductors in parallel with the hook switch 42 and the primary of the transformer 40*p*. As shown, the secondary of the transformer 40*s* is coupled to an audio circuit 44.

When the telephone 36 is on-hook (i.e., not in use such that the hook switch 38 is open) and a calling party places a telephone call to the telephone number of the telephone line 26, the central office 28 employs signals the telephone call to the telephone 36 by employing appropriate circuitry to place a relatively high (90 volt, e.g.) pulsed DC signal on the telephone line 26. Such pulsed DC signal thus causes the ringer circuit 42 of the telephone 36 to annunciate (audibly ring, e.g.), but does not reach the audio circuit 44 because of the open hook switch 38. Upon perceiving the annunciation of the ringer circuit 42, an individual 'picks up' the telephone 36 or the like, thereby closing the hook switch 38. The central office 28 senses the closing of such hook switch 38, ceases the pulsed DC signal, and makes an audio connection between the calling party and the telephone 36 by way of the telephone line 26.

Figure 3B:
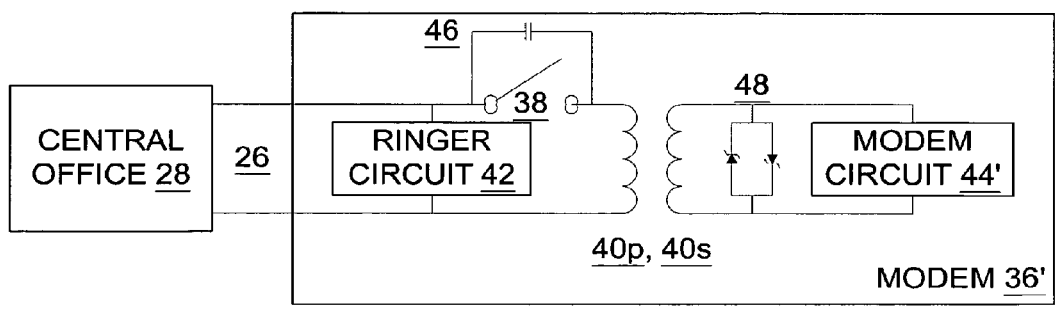
FIG. 3B is a schematic diagram of a telephone line and telephone device in an ADSI arrangement as employed in connection with the e-mail appliance of FIG. 1 in accordance with one embodiment of the present invention.

Referring now to FIG. 3B, it is seen that in a typical ADSI telephone arrangement, a device such as a modem 36' is coupled to the central office 28 by way of the telephone line 26. The modem 36' includes the circuitry typically included in the telephone 36 of FIG. 3A, although the audio circuit 44 is now a modem circuit 44'. In addition, the modem 36' includes a capacitor 46 placed in parallel across the hook switch 38, and a pair of zener diodes 48 in contra-parallel across the secondary of the transformer 40*s*. As may be appreciated, the capacitor 46 allows AC-coupling of signals on the telephone line 26 to the modem circuit 44' even when the modem 36' is on-hook (i.e., not in use such that the hook switch 38 is open). Since such AC-coupling can allow high voltages signals to appear on the secondary of the transformer 40*s*, the pair of zener diodes 48 act as voltage limiters to prevent such high voltages from reaching the modem circuit 44'.

Importantly, with the aforementioned AC-coupling of signals on the telephone line 26, the central office 28 can send AC signals over the telephone line 26 to the modem circuit 44' even when the modem 36' is on-hook. That is, the central office can send information to the modem 36' even if the modem 36' has not gone off-hook, and the telephone line 26 is still available for use. Typically, the central office 28 sends data over the on-hook telephone line 26 to the modem 36' by way of a signaling protocol which the modem 36' expects and recognizes, and the modem 36' then forwards the data onward. For example, in a caller identification device, the data would be received by a controller or processor that employs the data to display calling party information.

In one embodiment of the present invention, the modem 36' is in fact the modem 22 of the e-mail appliance 12, and the central office 28 sends data over the on-hook telephone line 26 to the modem 22 of the e-mail appliance 12. As should now be appreciated, the data sent to the e-mail appliance 12 by way of the modem 22 is in the nature of a message that new incoming e-mail message is awaiting retrieval for the individual possessing the e-mail appliance (i.e., step 207 of FIG. 2), and such message is received from the modem 22 by the processor 18 of the e-mail appliance 12.

The central office 28 may send the data by way of an on-hook signaling protocol such as the Bell 202 modem signaling protocol, wherein such signaling includes ASCII data characters. Other on-hook signaling protocols may of course be employed without departing from the spirit and scope of the present invention. For example, the signal could merely be some form of ASCII data, or could even have a more simple form, such as a short series of Morse-code-like long-and-short pulses.

In one embodiment of the present invention, the e-mail appliance 12 in response to the new incoming e-mail message awaiting retrieval signal from the central office 28 thereafter automatically calls into the e-mail server 24 by way of the telephone line 26, the central office 28, and the PSTN 30 in the normal manner and retrieves the new incoming e-mail messages from such e-mail server 24 (FIG. 2, step 209). The e-mail appliance 24 may then annunciate the retrieved new incoming e-mail messages by way of an appropriate annunciation device (a light on the e-mail appliance 12, an audio message emanated from the e-mail appliance 12, an appropriate icon on the screen 16 of the e-mail appliance 12, etc.) (step 211). In another embodiment of the present invention, the e-mail appliance 12 merely annunciates that new incoming e-mail messages are awaiting retrieval, again by way of an appropriate annunciation device (step 213).

In an alternate embodiment of the present invention, the aforementioned ADSI and Bell 202 protocols are dispensed with in connection with step 207 of FIG. 2. Instead, the central office signals the e-mail appliance 12 that a new incoming e-mail message is awaiting retrieval by placing a recognizable dial tone on the telephone line 26, where the recognizable dial tone is different than the regular dial tone (step 213). As is known, the dial tone on a telephone line 26, be it regular or otherwise, is generated by the central office 28 when an individual picks up the telephone 36 or the like, thereby closing the hook switch 38, in anticipation of placing a telephone call. The recognizable dial tone may for example be a stutter dial tone, although other recognizable dial tones may be employed without departing from the spirit and scope of the present invention.

Periodically, then, the e-mail appliance 12 causes the modem 22 thereof to go off-hook and 'listen' for the dial tone (step 215). The modem 22 may include a dial tone detector for such purpose, if necessary. If the dial tone is regular, no new incoming e-mail messages are awaiting retrieval, and the e-mail appliance does nothing. If the dial tone is the recognizable dial tone (step 217), however, new incoming e-mail messages are awaiting retrieval, and the e-mail appliance may then perform steps 209 and 211, or step 213.

In an alternate embodiment of the present invention, the secure server 29/central office 28 employs an on-hook protocol to send the new incoming e-mail message in addition to or instead of sending data that a new incoming e-mail message is awaiting retrieval. Of course, this would require that the e-mail server 24 send the new incoming e-mail message to the central office 28 instead of or in addition to communicating to the central office 28 that the incoming e-mail message is awaiting retrieval (i.e., step 205 of FIG. 2). Such on-hook protocol may be the aforementioned Bell 202 and ASDI protocols, although such protocols implement lower speed one-way data messaging. Accordingly, such protocols may be replaced by a higher speed two-way on-hook protocol, whereby the modem 22 can send data to the central office 28 while the telephone line 26 is still on-hook.

The programming necessary to effectuate the present invention, such as the programming run by the processor 18 of the e-mail appliance 12, the programming run by the e-mail server 24, the programming run by the secure server 29, and the programming run by the central office 28, is known or is readily apparent to the relevant public. Accordingly, further details as to the specifics of such programming are not believed to be necessary herein.

As should now be understood, in the present invention, a method and apparatus are provided to allow an e-mail server 24 to automatically notify an e-mail appliance 12 by way of a secure server 29 at a central office 28 that new incoming e-mail is awaiting retrieval by such e-mail appliance 12. Thus, the e-mail appliance 12 need not regularly perform any call-in routine to determine whether a new incoming e-mail message is awaiting retrieval. Changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A computing device for receiving notification of a new incoming message comprising:
a communications device for coupling with a communications line, the communications line being coupled to a communications system, the communications system coupled to a message sever, the communications device implementing an on-hook signaling protocol for receiving data-when the communications line is on-hook, wherein the received data includes the notification of the new incoming message and the communications device is configured to automatically retrieve the new incoming message from the message server in response to receiving the notification of the new incoming message;
wherein the communications system includes a secure server and at least a portion of a public switched telephone network which includes at least a portion of an SS7 network, the message server is coupled to the SS7 network, and the message server utilizes an encryption method for communicating an encrypted SS7 message including the notification of the new incoming message.

2. The device of claim 1 wherein the communications line having an identifier is a telephone line, and wherein the identifier is a telephone number.

3. The device of claim 1 wherein the message server is coupled to a data control network of the communications system.

4. The device of claim 1 wherein the incoming message is an e-mail message and the message server is an e-mail server.

5. The device of claim 1 wherein the communications system includes at least a portion of a public switched telephone network.

6. The device of claim 1 wherein the communications line is a telephone line.

7. The device of claim 1 wherein the communications device annunciates the new incoming message in response to automatically retrieving the new incoming message.

* * * * *

UNITED STATES PATENT AND TRADEMARK OFFICE
CERTIFICATE OF CORRECTION

| | | |
|---|---|---|
| PATENT NO. | : 8,045,684 B2 | Page 1 of 1 |
| APPLICATION NO. | : 11/844373 | |
| DATED | : October 25, 2011 | |
| INVENTOR(S) | : Charles M. Link, II and Vernon Meadows | |

It is certified that error appears in the above-identified patent and that said Letters Patent is hereby corrected as shown below:

In Claim 1, column 8, line 45, "sever" should read --server--.

In Claim 1, column 8, line 47, "data-when" should read --data when--.

Signed and Sealed this
Thirty-first Day of January, 2012

David J. Kappos
*Director of the United States Patent and Trademark Office*